Dec. 23, 1941.    M. M. BORDEN    2,266,955
MANOMETER
Filed May 16, 1938

Inventor:—
Moro M. Borden
by his Attorneys
Howson & Howson

Patented Dec. 23, 1941

2,266,955

UNITED STATES PATENT OFFICE 2,266,955

MANOMETER

Moro M. Borden, Philadelphia, Pa., assignor to Simplex Valve and Meter Company, Philadelphia, Pa., a corporation of Delaware Application May 16, 1938, Serial No. 208,304

3 Claims. (Cl. 73—31)

This invention relates to manometers of the U-tube type, and has for an important object thereof the provision in a device of this character of means for varying the liquid movement in one leg of the tube in response to differential pressures, so that whether the total differential pressures to which the tube is subjected are large or small, a standard movement of the liquid in said leg may be maintained, thus permitting use of a standard gauge reading under all circumstances. To this end, one leg of the U-tube is made of fixed capacity while the other is made variable in capacity, yet of uniform cross section, variations in capacity being attained through a tilting movement of the second leg of the U-tube.

The above and other objects I attain through the construction shown in the accompanying drawing wherein, for the purpose of illustration, I have shown a preferred embodiment of my invention and wherein.

Figure 1:
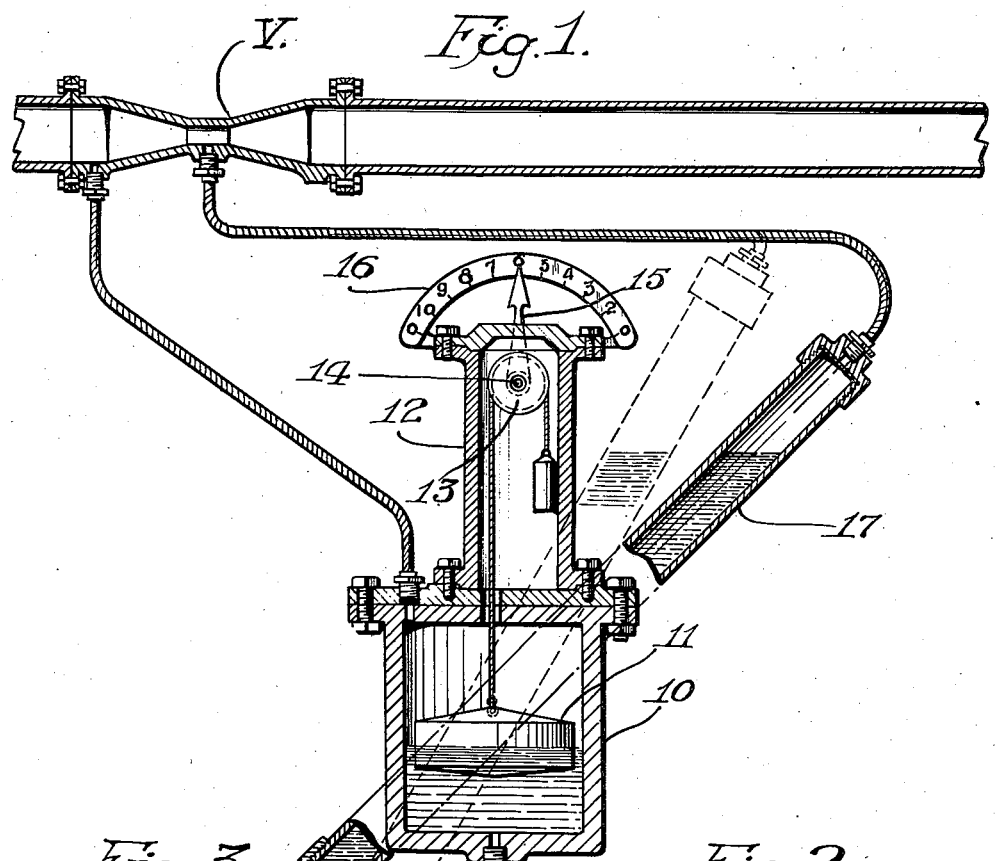
Fig. 1 is a semidiagrammatic sectional view illustrating a manometer constructed in accordance with my invention and an indicator operated thereby, the adjustment of the tube being indicated in dotted lines.
Figures 2, 3:
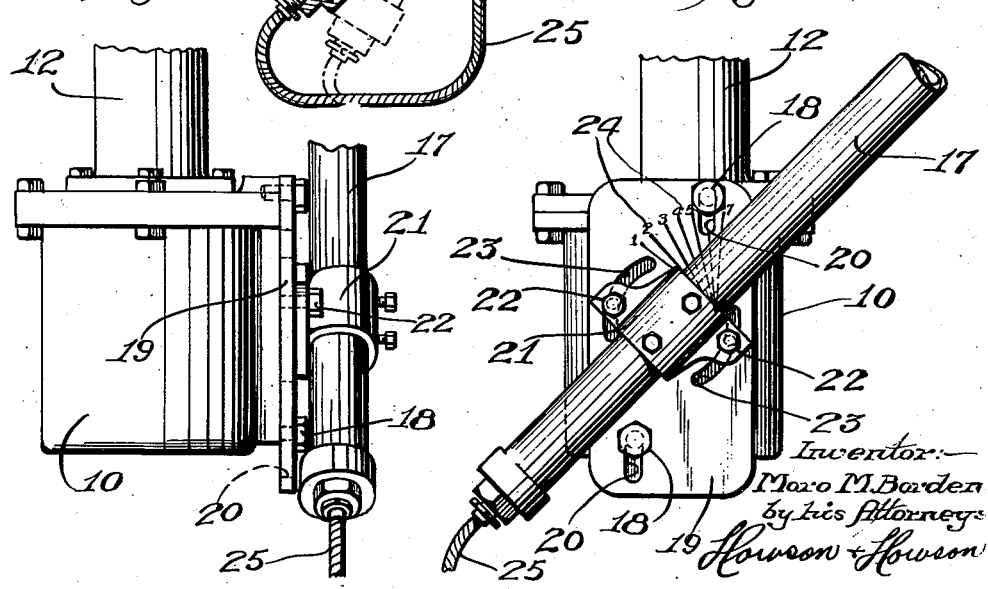
Fig. 2 is a fragmentary rear elevation of the manometer.
Fig. 3 is a fragmentary side elevation thereof.

Referring now more particularly to the drawing, the numeral 10 designates one leg of a U-tube at present shown as in the form of a fixed capacity chamber containing a float 11. This chamber, as illustrated, supports an indicator casing 12 in which is arranged a sheave 13 rotated by the movement of the float and through a shaft 14 operating a pointer 15 coacting with a graduated dial 16.

The second leg 17 of the U-tube is a tube of uniform cross section and is mounted upon a suitable support for both vertical and angular adjustment. As at present illustrated, this support comprises the wall of the fixed leg 10 which has secured thereto through bolts 18 a plate 19, the bolts extending through vertical slots 20 permitting vertical adjustments of the plate. A support 21 for the leg 17 is rotatably engaged with plate 19, bolts 22 engaging in arcuate slots 23 in the plate serving to permit the rotative adjustment of the support 21 and tube 17 and to secure the same after adjustment. The extent of rotative adjustment may be determined through graduations 24 placed upon the plate 19, if so desired. The lower ends of the legs 10 and 17 are connected by a flexible tube 25.

It will be obvious that since the tube 17 is rotatable about an axis transverse thereto, any rotation thereof will vary the capacity of the tube, as regards liquid levels arising therein to the same extent. Thus, a U-tube with a fixed graduation series, as at the dial 16, may be adapted for use with a variety of differential pressures as produced by a venturi V or the like with which it is connected. Furthermore, variations in conditions in a given line, due to alteration of appurtenances of the line or in the meter itself due to variations in the quantity of fluid therein, may be compensated for by a simple adjustment of the leg 17 either vertically, rotatably, or both.

Since the construction illustrated is obviously capable of considerable variation without departing from the spirit of my invention, I do not wish to be understood as limiting myself thereto except as hereinafter claimed.

I claim:

1. In a manometer, a fluid-containing U-tube comprising a fixed leg of fixed volume capacity, a tiltable leg of uniform cross section above its datum liquid level and a communicating connection between the fixed and tiltable legs, and means to adjust the axis of tilt of said tiltable leg vertically of the fixed leg.

2. In a manometer, a fluid-containing U-tube comprising a fixed leg of fixed volume capacity, a tiltable leg of uniform cross section above its datum liquid level, a communicating connection between the fixed and tiltable legs, and means to adjust the axis of tilt of said tiltable leg vertically of the fixed leg, a float operated by the fluid in the fixed leg, and an indicator operated by the float.

3. In a manometer, a fluid-containing U-tube comprising a fixed leg of fixed volume capacity, a tiltable leg of uniform cross section above its datum liquid level, a communicating connection between the fixed and tiltable legs, and means to adjust the axis of tilt of said tiltable leg vertically of the fixed leg, and an indicator operated by the fluid level of the fixed leg.

MORO M. BORDEN.